United States Patent [19]
Chung et al.

[11] Patent Number: 6,005,889
[45] Date of Patent: Dec. 21, 1999

[54] PSEUDO-RANDOM NOISE DETECTOR FOR SIGNALS HAVING A CARRIER FREQUENCY OFFSET

[75] Inventors: Sanguoon Chung; Thomas J. Kenney, both of San Diego, Calif.

[73] Assignee: Nokia, Espoo, Finland

[21] Appl. No.: 08/895,698

[22] Filed: Jul. 17, 1997

[51] Int. Cl.[6] .................................................. H04B 1/69
[52] U.S. Cl. ........................................ 375/208; 375/344
[58] Field of Search .................................. 375/200, 208, 375/344; 370/210, 350, 515

[56] References Cited

U.S. PATENT DOCUMENTS

| | | |
|---|---|---|
| 4,045,796 | 8/1977 | Kline, Jr. . |
| 4,122,393 | 10/1978 | Gordy et al. . |
| 4,460,992 | 7/1984 | Gutleber . |
| 4,485,477 | 11/1984 | Nossen . |
| 4,567,588 | 1/1986 | Jerrim . |
| 4,630,283 | 12/1986 | Schiff . |
| 4,649,549 | 3/1987 | Halpern et al. ............................ 380/32 |
| 4,701,934 | 10/1987 | Jasper ...................................... 375/206 |
| 4,707,839 | 11/1987 | Andren et al. . |
| 4,785,463 | 11/1988 | Janc et al. ................................ 375/206 |
| 4,933,952 | 6/1990 | Albrieux et al. . |
| 5,016,255 | 5/1991 | Dixon et al. . |
| 5,022,047 | 6/1991 | Dixon et al. . |
| 5,031,191 | 7/1991 | Hiramatsu et al. . |
| 5,103,459 | 4/1992 | Gilhousen et al. . |
| 5,146,471 | 9/1992 | Cowart . |
| 5,166,952 | 11/1992 | Omurg et al. . |
| 5,179,570 | 1/1993 | Imran . |
| 5,218,619 | 6/1993 | Dent . |
| 5,243,622 | 9/1993 | Lux et al. . |
| 5,253,268 | 10/1993 | Omura et al. . |
| 5,255,290 | 10/1993 | Anvari . |
| 5,276,710 | 1/1994 | Iwasaki . |
| 5,280,538 | 1/1994 | Kataoka et al. . |
| 5,303,257 | 4/1994 | Stein et al. . |
| 5,309,474 | 5/1994 | Gilhousen et al. . |
| 5,347,284 | 9/1994 | Volpi et al. ............................. 342/356 |
| 5,353,302 | 10/1994 | Bi . |
| 5,359,624 | 10/1994 | Lee et al. . |
| 5,396,515 | 3/1995 | Dixon et al. ............................ 375/208 |
| 5,414,728 | 5/1995 | Zehavi ..................................... 375/200 |
| 5,440,597 | 8/1995 | Chung et al. ........................... 375/200 |
| 5,446,727 | 8/1995 | Bruckert et al. . |
| 5,497,395 | 3/1996 | Jou .......................................... 375/205 |
| 5,499,265 | 3/1996 | Dixon et al. ............................ 375/200 |
| 5,544,155 | 8/1996 | Lucas et al. . |
| 5,553,081 | 9/1996 | Downey et al. . |
| 5,566,202 | 10/1996 | Lang ....................................... 375/210 |
| 5,577,022 | 11/1996 | Padovani et al. . |
| 5,590,160 | 12/1996 | Ostman .................................. 375/367 |
| 5,602,833 | 2/1997 | Zehavi .................................... 370/209 |
| 5,610,940 | 3/1997 | Durrant et al. ......................... 375/208 |
| 5,623,485 | 4/1997 | Bi ........................................... 370/209 |

*Primary Examiner*—Stephen Chin
*Assistant Examiner*—Lenny Jiang
*Attorney, Agent, or Firm*—Brown, Martin, Haller & McClain

[57] ABSTRACT

In the front end of a mobile phone receiver for operation in a network using DSSS signals, detection of a carrier frequency offset in a received PN-modulated signal is performed by first correlating the received signal with a local replica of the PN codes generated within the receiver. The resulting despread signal is integrated over a fixed period, or dwell, of time, then run through a square-law envelope detector. The integration is divided into a plurality of sub-dwells, the values of which are each provided as an input to a Fast Fourier Transform (FFT) to generate a plurality of frequency bins. The magnitude for each FFT frequency bin is computed and a maximum value is selected. The maximum value and its corresponding bin number are saved in the signal processor's memory. The next PN code phase is tested and, depending on the search scheme, this sequence continues until the decision algorithm terminates the search. In one embodiment, the magnitude is calculated for each bin for the collected samples by passing the data through a filter bank with one filter for each bin in the frequency domain, then operated on by a decision algorithm which compares the value to a pre-set threshold. After a match has been declared and the search is terminated, estimation of the frequency offset is achieved by averaging the bin indices for the highest magnitude per iteration following a number of iterations of the search process performed at the PN code phase at which the match was found.

26 Claims, 3 Drawing Sheets

PSEUDO-RANDOM NOISE DETECTOR FOR SIGNALS HAVING A CARRIER FREQUENCY OFFSET

BACKGROUND OF THE INVENTION

1. Field of the Invention

The present invention relates generally to a method and device for detection of direct sequence spread spectrum (DSSS) signals using pseudo-random noise (PN) modulation when offsets are present in the carrier frequency.

2. Description of the Related Art

Wireless communications systems based upon direct sequence spread spectrum (DSSS) signals, including code division multiple access (CDMA), use a common carrier frequency band for communication with all base stations within a system. The carrier signal is modulated by a signal generated by a pseudo-random noise (PN) generator, which provides means for discrimination from the common frequency band. The PN spreading code contained in this second signal consists of a sequence of binary chips, each having a chip period. The combined carrier and PN signals are modulated by a third signal comprising a digitized voice or data signal.

In order to convert the third signal for use at the receiver, after carrier frequency demodulation, a local PN generator in the receiver must be synchronized to the incoming PN sequence. The PN codes are used for both initial acquisition of the signal and for data transmission. By removing the PN sequence from the received signal and integrating it over a symbol period, a despread signal can be obtained. The despreading of the received signal is accomplished by generating a local replica of the PN code in the receiver, then synchronizing the local PN code to the PN code which is superimposed on the received waveform contained in the received signal. Multiplication or remodulation of the incoming signal by the synchronized local PN code replica produces the desired despreading.

In the acquisition phase, the spreading signals are brought into alignment with each other. It is during this phase that the receiver must perform some of its most critical functions, which are to establish chip timing synchronization and correct for frequency offset. Once synchronization is attained, a closed loop tracking system within the receiver clock must be continuously adjusted in frequency and phase in order to optimize the sampling of the data signal extracted from each received signal.

The process of synchronizing the local and received PN signals is typically performed in two stages. Initially, a coarse alignment of the two PN signals is produced to within a small residual timing offset to achieve PN acquisition. Once acquired, the PN codes must be maintained in fine synchronization in a process known as PN tracking. In direct sequence CDMA systems, the PN codes are often very long. To minimize the receiver hardware complexity that would be required for correlation of the full PN code, correlation over a partial period of the PN code, i.e., the "dwell time", is used.

Detection of DSSS signals for acquisition is typically achieved using a receiver similar to the configuration shown in FIG. 1, which consists of a correlator 102 for comparing the received signal plus noise with a local replica of the PN code from the local PN generator 104, an integrator 106 for integrating the detector output for a fixed dwell time to find the total integration power, a square law envelope detector 108, and a comparator 110 for comparing the power to a pre-set threshold. When the power level exceeds the threshold, the coarse alignment of the PN signal has been achieved. The optimal threshold level which is used to determine whether acquisition has occurred is not related to a fixed value, but is instead a function of the signal-to-noise ratio (SNR). As is known, the SNR of a communication channel will vary as a function of time as well as the velocity and location of the receiver.

A simple exemplary acquisition technique uses a maximum likelihood approach with single dwell time. This technique requires the received PN code signal to be correlated with all possible phase positions of the local PN code. The correlations are performed in parallel and the corresponding detector outputs all pertain to the identical observation (dwell) of the received signal (plus noise). The correct PN alignment is determined by a comparator as being the local PN code phase position which produces the maximum output from the detector. The acquisition can be accomplished rapidly due to the parallel operation. However, for the lengthy codes utilized in CDMA signals and the large processing gains required, the complexity of the parallel computation is prohibitive. Other acquisition techniques are known in the art. A brief description of some of these techniques is provided in U.S. Pat. No. 5,440,597 of Chung, et al, the subject matter of which one of the present inventors is also a co-inventor. The disclosure of the '597 patent is incorporated herein by reference.

When frequency error exists between the transmitter and receiver, due either to multi-path transmission (Rayleigh fading), temperature-induced oscillator drift, Doppler effect, or other distortion-producing phenomenon, or a combination thereof, the receiver/demodulator must first determine the frequency offset before acquisition can occur. The presence of frequency offsets cause the relative code phase between the received and locally generated PN codes to be time varying. More significantly, the offsets effect the average search rate.

When detecting a signal that has passed through an Additive White Gaussian Noise (AWGN) channel, the detection time is a function of the noise variance only. The greater the noise variance, the longer the time required for correlation, leading to longer detection times. Since frequency offsets also increase the detection time, the presence of a frequency offset in an AWGN channel can cause what might otherwise be acceptable detector performance to experience significant degradation. The ability to coherently detect the signal from an AWGN channel may be lost due to the presence of frequency offset.

A common approach to alleviate the frequency offset problem, and deal with the lengthy PN codes, is to segment the total integration time into a number of smaller partial correlations, or sub-dwells (observation periods of the received signal), to reduce the loss resulting from the frequency term. The magnitude is computed for each of the sub-dwells, and the magnitudes for all of the sub-dwells are summed to obtain a total integration magnitude. This type of acquisition system is known as the "non-coherent addition method", which is a type of multiple dwell serial PN acquisition system. (See, e.g., M. K. Simon, et al., *Spread Spectrum Communications Handbook, Revised Edition,* 1994, McGraw-Hill, Inc., Part 4, Ch. 1, "PseudoNoise Code Acquisition in Direct-Sequence Receivers", incorporated herein by reference.) The resulting total magnitude in this method is significantly reduced, since the sub-dwells represent only a fraction of the dwell time, making this approach feasible only when small frequency offsets are present, or short integration times are possible. Another disadvantage of this method is that coherent detection cannot be attained.

One proposed system for determining frequency offset is disclosed in U.S. Pat. 5,556,202 of Lang, which is incorporated herein by reference. In this system, a split correlator channel includes a pair of shift register strings with the corresponding stages of each string being of equal lengths. The received signal is partitioned between the stages. A phase rotator is provided between consecutive stages of the shift register strings, distributing the in-phase (I) and quadrature (Q) components of the received signal to the appropriate shift register string. Each shift register string stage is correlated with the selected PN sequence, and the results are summed and compared to the pre-set threshold for correlation. Assumptions are made with regard to phase rotation which can introduce errors. Further, this system still uses the non-coherent addition method, retaining certain disadvantages of such systems.

The needs remains for a system for rapidly determining frequency offsets for PN signal acquisition without relying on non-coherent methods. The system of the present invention addresses this need.

SUMMARY OF THE INVENTION

It is an advantage of the present invention to provide a method and system for detecting frequency offsets in a PN signal with decreased detection times.

It is another advantage of the present invention to provide a method and system for improved PN signal acquisition using a semi-coherent detector.

Still another advantage of the present invention is to provide a method and system for frequency offset estimation with little additional processing.

In an exemplary embodiment, in the front end of a mobile phone receiver for operation in a network using DSSS signals, detection of a carrier frequency offset in a received PN-modulated signal is performed by first correlating the received signal with a local replica of the PN codes generated within the receiver. The resulting despread signal is integrated over a fixed period, or dwell, of time, then run through a square-law envelope detector. The integration is divided into a plurality of sub-dwells, the values of which are each provided as an input to a Fast Fourier Transform (FFT) to generate a plurality of frequency bins. The magnitude for each FFT frequency bin is computed and a maximum value is selected. The maximum value and its corresponding bin number are saved in the signal processor's memory. The next PN code phase is tested and, depending on the search scheme, this sequence continues until the decision algorithm terminates the search. In one embodiment, the magnitude is calculated for each bin for the collected samples by passing the data through a filter bank with one filter for each bin in the frequency domain, then operated on by a decision algorithm which compares the value to a pre-set threshold. Alternatively, the bins could be searched, either serially or in parallel to select the maximum value(s) within any given integration.

After a match has been declared and the search is terminated, estimation of the frequency offset is achieved by averaging the bin indices for the highest magnitude per iteration following a number of iterations of the search process performed at the PN code phase at which the match was found. The resulting value is the frequency offset which can be used to compute the received carrier frequency, which information can be provided to an automatic frequency control (AFC) circuit in the receiver to fine tune the receiver to the correct frequency. The performance of the frequency estimator is a function of the number of samples used in the averaging process.

DESCRIPTION OF THE DRAWINGS

Understanding the present invention will be facilitated by consideration of the following detailed description of a preferred embodiment of the present invention taken in conjunction with the accompanying drawings, in which like numeral refer to like parts and in which.

DETAILED DESCRIPTION OF THE PREFERRED EMBODIMENT

The following detailed description of the preferred embodiment describes application of the inventive method and device to a CDMA mobile phone receiver operated in accordance with TIA/EIA IS-95 (Mobile Station—Base Station Compatibility Standard for Dual-Mode Wideband Spread Spectrum Cellular System). It should be noted that the methods described herein are similarly applicable to other DSSS-based wireless communication systems which utilize PN code-modulated signals.

The following detailed description utilizes a number of acronyms which are generally well known in the art. While definitions are typically provided with the first instance of each acronym, for convenience, Table 1 below provides a list of the acronyms and their respective definitions.

TABLE 1

| ACRONYM | DEFINITION |
|---------|------------|
| A/D | Analog to Digital (converter) |
| AFC | Automatic Frequency Control |
| AGC | Automatic Gain Control |
| ASIC | Application Specific Integrated Circuit |
| AWGN | Additive White Gaussian Noise |
| BPF | Band Pass Filter |
| CDMA | Code Division Multiple Access |
| DFT | Discrete Fourier Transform |
| DS | Direct Sequence |
| DSSS | Direct Sequence Spread Spectrum |
| FFT | Fast Fourier Transform |
| IF | Intermediate Frequency |
| IIR | Infinite Impulse Response |
| IS | Interim Standard |
| LNA | Low Noise Amplifier |
| LO | Local Oscillator |
| LPF | Low Pass Filter |
| MS | Mobile Station |
| PN | Pseudo-random Noise |
| RF | Radio Frequency |
| SAW | Surface Acoustic Wave |
| SNR | Signal to Noise Ratio |

Figure 2:
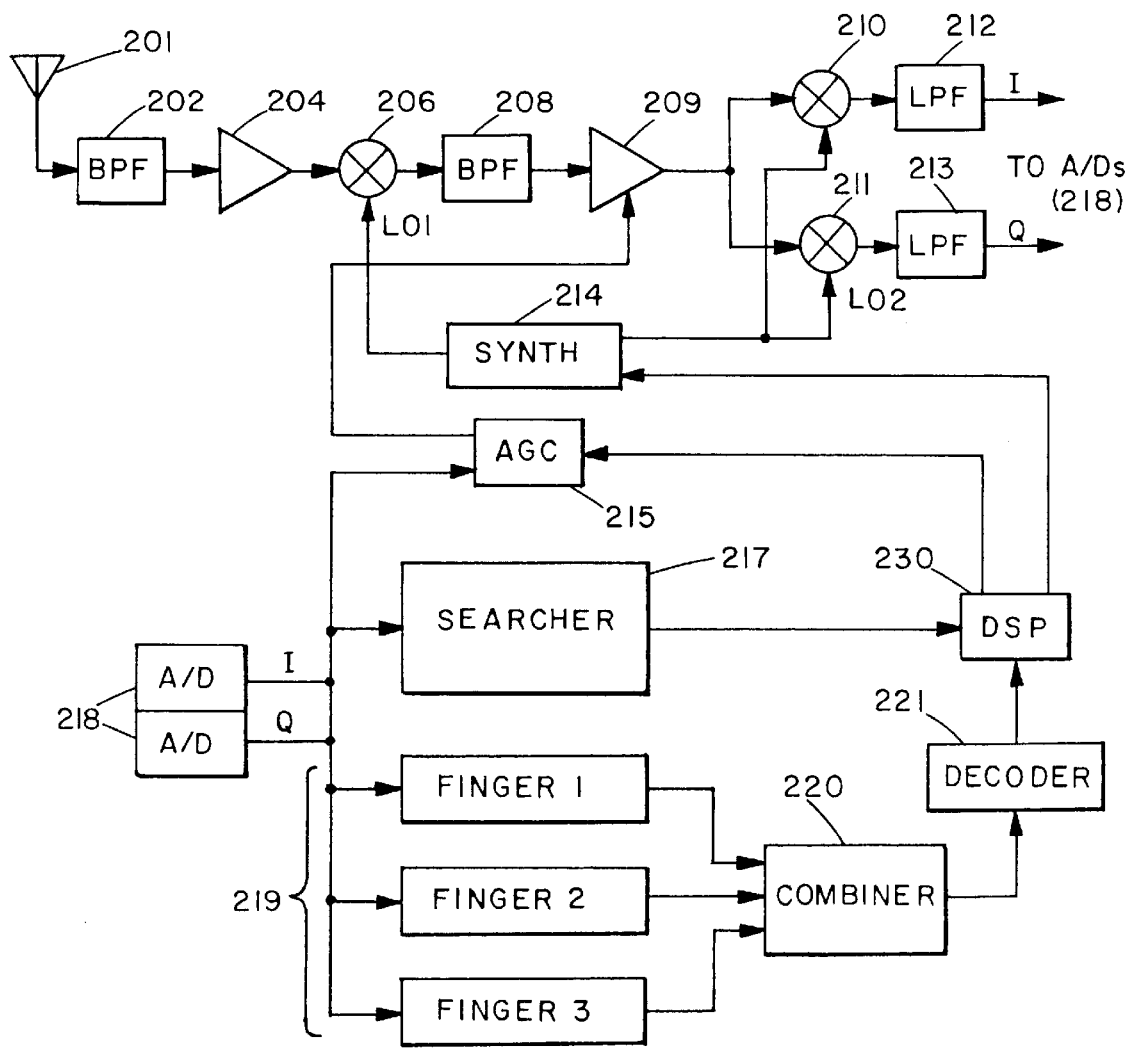
FIG. 2 is a block diagram of the front end of a cellular phone receiver according to the present invention along with other receiver functions.

A block diagram of the architecture of a preferred embodiment for implementation of the frequency offset detection and estimation method of the present invention is provided in FIG. 2. A transmitted signal is received at antenna 201 and passed through broad-band bandpass filter 202, which, for a CDMA system, passes only receive channels from 869 to 894 MHZ to be considered for demodulation by the receiver. The broad band-filtered signal is coupled to low noise amplifier (LNA) 204 and out to mixer/local oscillator (LO) 206 which down-converts the received signal to an intermediate frequency (IF) signal. The IF signal is filtered through bandpass filter 208 and amplified by variable gain amplifier (VGA) 209 according to the control signal provided by automatic gain controller (AGC) 215. From the output of VGA 209, the IF signal is phase split into its I (in-phase) and Q (quadrature) components at mixer/LOs 210, 211 which are then coupled through low pass filters (LPF) 212, 213 to analog-to-digital converters (A/D) 218. LPFs 212, 213 are preferably CDMA SAW filters, as are known in the art. Frequency synthesizer 214, which typically includes a crystal oscillator for frequency reference and a phase detector, generates a control voltage signal to adjust the frequency of LOs coupled to mixers 207, 210 and 211. The components within this portion of the receiver comprise the analog receiver.

The digitized IF signal includes the PN modulated signal plus noise. In the digital receiver, the digitized signal is coupled to automatic gain control (AGC) block 215, PN searcher 217, and a digital data receiver consisting of RAKE demodulator 219, combiner 220 and channel decoder block 221. The 20 one-sided bandwidth of the CDMA signal is 0.6144 MHZ, so the digital signal from A/Ds 218 is sampled at the minimum data rate of 1.2288 MHZ to satisfy sampling theory requirements.

In the digital data receiver, RAKE demodulator 219 has three parallel fingers, each of which includes a local PN generator. The outputs from the 25 fingers of RAKE demodulator 219 are summed at maximum ratio combiner 220 and passed to channel decoder block 221. From channel decoder block 221, the data is passed to the digital signal processor (DSP) 230 at a frame rate of 50 Hz. For ease of implementation and overall size reduction of the mobile phone, AGC block 215, PN searcher block 217, RAKE demodulator 219, combiner 220 and channel decoder 221, and the connections between various elements are preferably integrated onto an ASIC (application specific integrated circuit).

Figure 1:
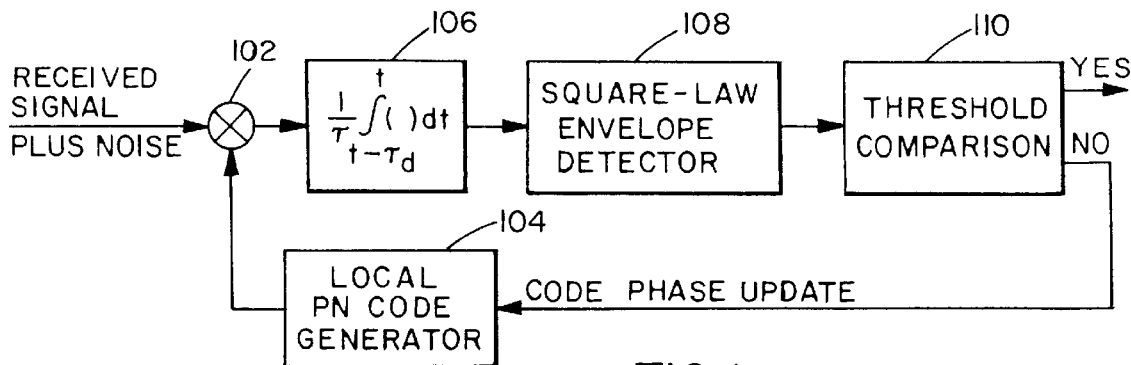
FIG. 1 is a block diagram of a prior art PN acquisition system.

Searcher block 217, under the direction of DSP 230, acquires the signal using a configuration in accordance with the PN acquisition system of FIG. 1. The searcher block also includes a RAM within which the signal samples are stored. The operations of interest for frequency offset detection and estimation occur within searcher block 217 and DSP 230.

Figure 3:
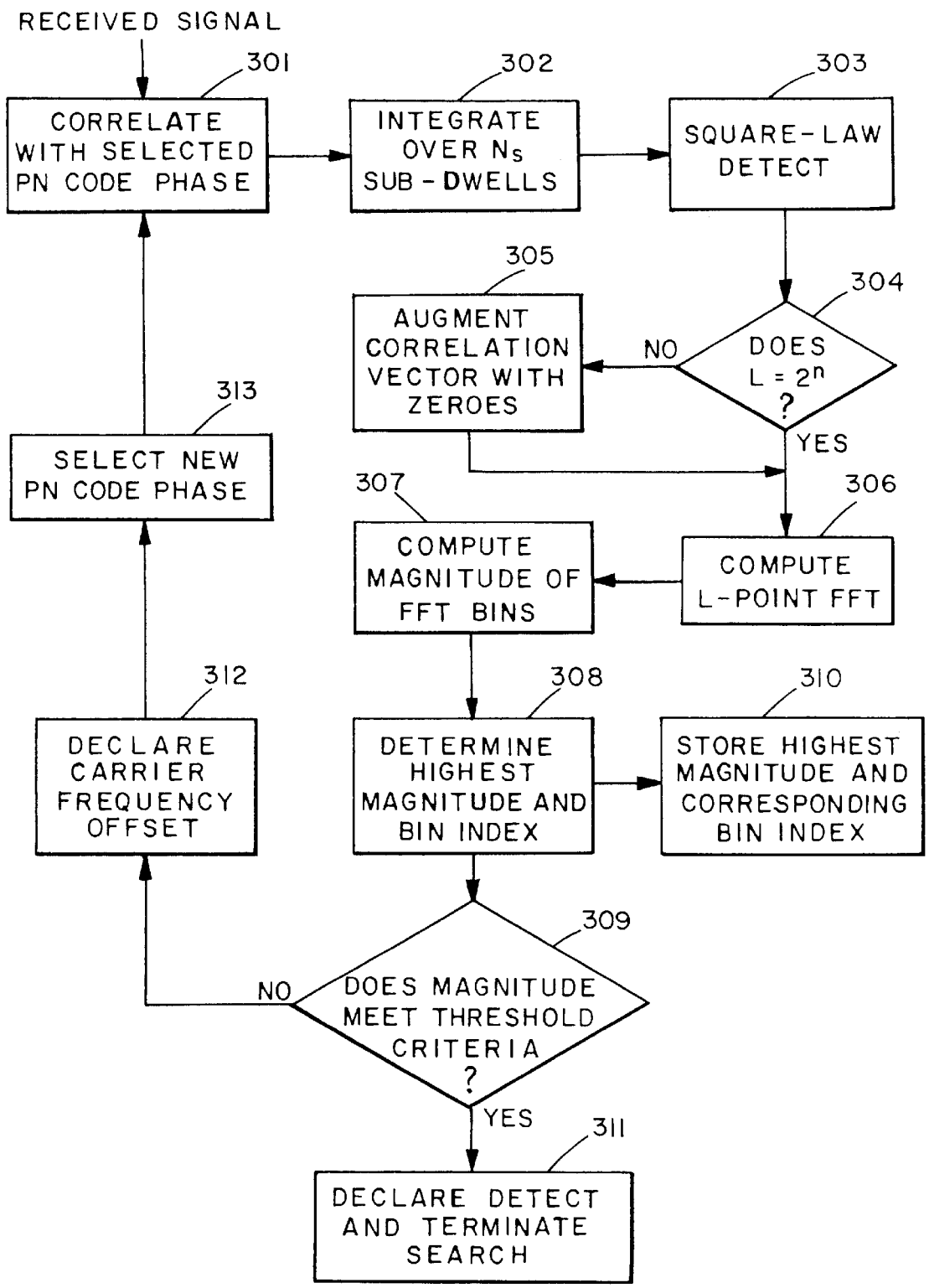
FIG. 3 is a flow diagram showing the process for detection of frequency offset.

Referring now to FIG. 3, beginning with the transfer of the received, downconverted signal from the A/Ds 218 to the searcher block 217, the received signal samples are correlated in using a signal from a local PN generator (step 301), with the resulting correlated signal being divided into $N_s$ sub-dwells, each sub-dwell integrated over a sub-dwell time ($T_s$)(step 302) and passed through a square-law envelope detector (step 303). The $N_s$ complex correlation values are computed according to equation (1):

$$R_n^{(p)} = \sum_{m=0}^{N_c-1} r(n - pN_c + m + t_0) \cdot a^*(n - pN_c + m) \quad p = 1, 2, \ldots, N_s \quad (1)$$

where n is the relative PN code phase position;

$N_c$ is the number of chips in the sub-dwell correlation;

p is the sub-dwell correlation index;

$N_s$ is the number of sub-dwells;

$t_o$ is some real valued initial time offset; and $R_n$, r, and a* are all complex values.

In step 304, the length of the correlation vector $R_k$ is evaluated to determine if it is a power of two, i.e., if vector length $L=2^n$. (For example, L could be 4, 8, 16, ..., 64, etc.) If $L \neq 2^n$, it should be augmented with zeroes, i.e., "zero padded" (step 305), as shown in equation (2) to make final vector length L a power a two:

$$\vec{R}_n = [\, R_n^{(0)} \quad R_n^{(1)} \quad R_n^{(2)} \quad \ldots \quad R_n^{(N-1)} \quad 0 \quad 0 \quad \ldots \quad 0\,] \quad (2)$$

For description purposes, it will be assumed that there are L sub-dwell values available so that zero padding is not required, i.e., $N_s=L$.

The L sub-dwell integration values are transferred to DSP 230 where an L-point DFT (discrete Fourier transform) is computed using the FFT algorithm to provide L discrete samples (bins) within the frequency spectrum (step 306).

$$Y_n^{(k)} = \sum_{l=0}^{L-1} R_n^{(l)} \cdot w(kT_s) \cdot e^{-j2\pi k \cdot \frac{l}{N_s}} \quad k = 0, 2, \ldots, L-1 \quad (3)$$

where $T_s$ is the sub-dwell sampling rate; and w is the corresponding window function, which is rectangular. L may be as small as 8 or 16, however, as is known, the larger the FFT, the better the performance. The centers of the bins are located at $x(f_s/N)$, where x is an integer ($-L/2 \geq x \geq L/2$). Given the above assumption that L is a power of two and zero padding is not being used, equation (3) can be expressed as:

$$Y_n^{(k)} = \quad (4)$$

$$\sum_{p=0}^{N_s-1} \left\{ \sum_{m=0}^{N_c-1} r(n - pN_c + m + l) \cdot a^*(n - pN_c + m) \right\} \cdot w(k) \cdot e^{-j2\pi kp/N_s}$$

In step 307, the magnitude for each of the L bins is computed:

$$Y_n^{(k)} = |Y_l(k)| \quad (5)$$

and processed according to Equation 6 to determine the maximum magnitude (step 308):

$$Z = \max(Y_n^{(k)}) \quad (6)$$

An infinite impulse response (IIR) filter, or a finite impulse response filter (FIR), both of which are known in the art, may be used for this purpose. (See, e.g., Marven and Ewers, *A Simple Approach to Digital Signal Processing*, 1996, Wiley Interscience, New York).

In step 309, the maximum Z is compared to the detection threshold:

$$Z \begin{array}{c} H_1 \\ > \\ < \\ H_2 \end{array} t_d \quad (7)$$

where t is the optimized threshold (based on the search algorithm), $H_1$ is the hypothesis which is true when the PN codes are synchronized and $H_2$ is true when the PN codes are misaligned. A number of different approaches to determine the optimal threshold are known within the prior art. Any of these approaches may be modified for this test.

If the maximum value Z does not meet the threshold criteria, the search algorithm declares a carrier frequency offset (step 312), a new PN phase code is selected (step 313), and the process is repeated from steps 301 through 309.

The maximum value Z and its corresponding bin index I(n) that are determined during step 308 are stored within memory in DSP 230 (step 310). Once the threshold criteria is met, the search algorithm declares a detect and terminates the search (step 311).

Since the FFT has already accumulated the signal energy at discrete frequencies, it is possible to continue the process to provide an estimate of the frequency offset. The frequency resolution is a function of the FFT size and its sampling frequency. Multiple correlations can be averaged, i.e., testing the correct PN offset frequency N times provides N estimates of the received signal magnitude and frequency. The qualifying frequency bins are averaged to provide better frequency resolution.

Figure 4:
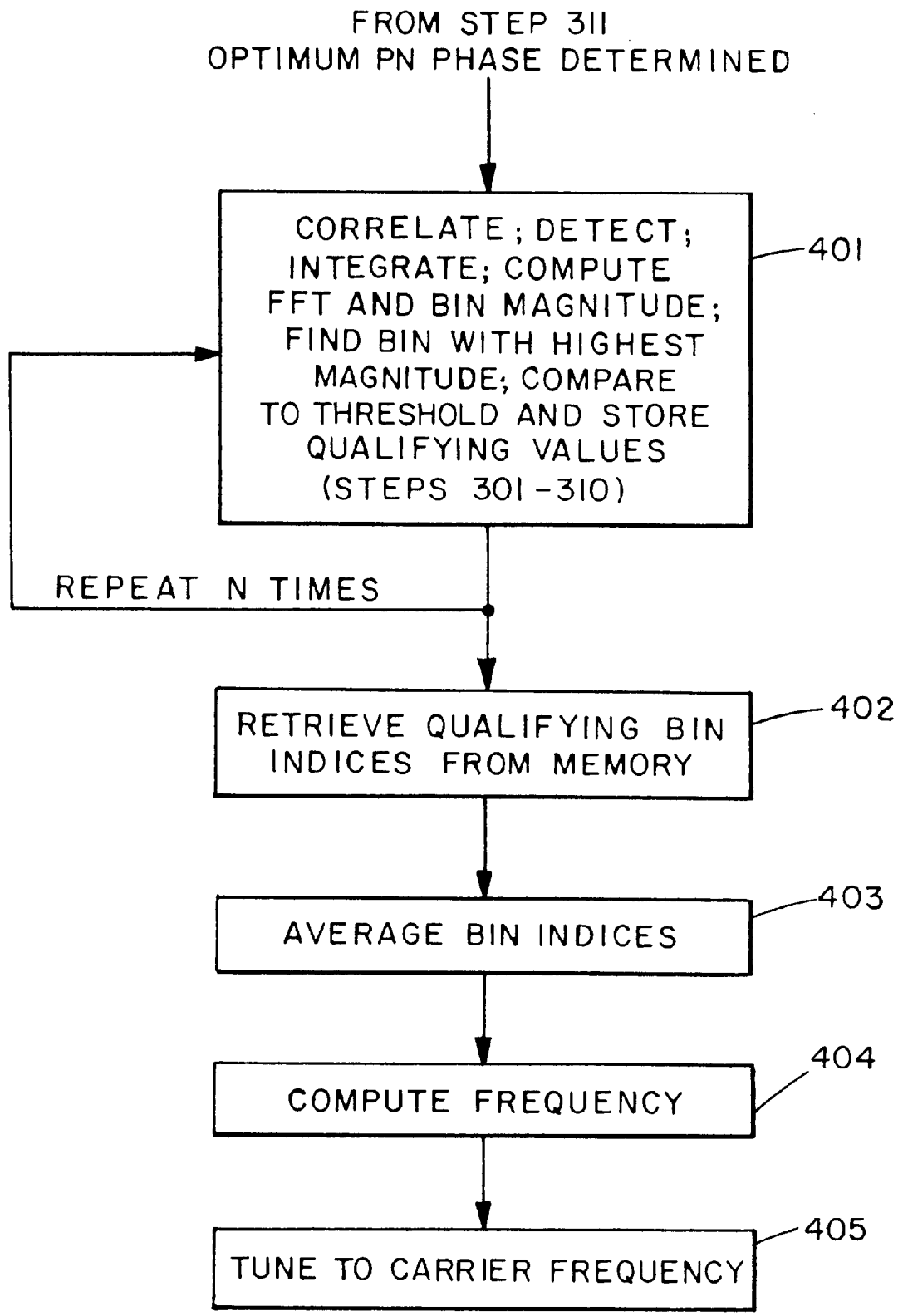
FIG. 4 is a flow diagram showing the process for estimation of frequency offset.

FIG. 4 provides the sequence for determining relative frequency offset, which is a continuation of the sequence of FIG. 3 in which the presence of a frequency offset was detected. Following determination of the maximum component of the FFT output vector and termination of the search (step 311), the correct offset is correlated N additional times, each time computing the magnitude and finding and comparing the maximum frequency component according to steps 301 through 309, shown here collectively as step 401. The magnitudes for the L bins which exceeded the threshold in step 309, the "qualifying bins", and their corresponding bin indices are retrieved from the DSP's memory (step 402). The indices of the qualifying bins are averaged (step 403):

$$K = \frac{1}{L_p} \sum_{n=1}^{L_p} I(n) \quad I(n) = \{0, 1, \ldots, (L-1)\} \quad (8)$$

where I(n) is the index vector of a qualifying bin and $L_p$ is the number of qualifying bins.

Positive or negative relative frequency offset is determined and the frequency is computed as follows (step 404):

$$\text{If } (K < (L/2)): \quad \hat{f} = \frac{K}{T_c \cdot L \cdot N_p} \quad (9)$$

$$\text{Else:} \quad \hat{f} = \frac{K - L}{T_c \cdot L \cdot N_p} \quad (10)$$

where $T_c$ is the PN chip period.

L/2 represents an ambiguity boundary such that, if the frequency offset approaches L/2, additional logic may be required in order to calculate the frequency. The accuracy of the frequency estimator is a function of the number of samples $L_p$, and will improve with a greater number of samples.

The calculated frequency is provided to frequency synthesizer 214 (shown in FIG. 2) or to an AFC circuit or other frequency compensating means for adjusting the frequency of the local oscillator to match the carrier frequency (step 405).

The inventive system and method for detecting and estimating carrier frequency offset uses a "semi-coherent" method, which, although not fully coherent, provides greater accuracy than non-coherent methods of the prior art. Due to the discrete nature of the FFT, and the fact that the implementation itself is discrete, coherent correlation is attained only at the bin centers. Some additional loss is incurred due to the scalloping effects of the FFT process. This loss can be as high as 3.96 dB at the half point between bin centers. The larger the FFT length, using zero padding, the better the performance across all frequencies, however, this would be implemented at the expense of increased complexity and processing time.

The device for implementation of the method of detection and estimation of carrier frequency offset can be implemented with hardware components which are already present within the mobile phone's architecture, allowing implementation to be attained at minimal cost. With a moderate length FFT (8 or 16 point), detection performance is significantly improved for detecting signals typically found in an IS-95-based CDMA system, even in the presence of substantial frequency offsets (>6 kHz). These improvements are attained using the same sub-dwell and total integration lengths that are used for prior art non-coherent addition acquisition techniques, with the added advantage that the same detector can be used for estimating the frequency offset.

It will be apparent to those skilled in the art that various modifications and variation can be made in the system of the present invention without departing from the spirit or scope of the invention. Thus, it is intended that the present invention cover the modification and variations of this invention provided they come within the scope of the appended claims and their equivalence.

We claim:

1. A detector for detecting a carrier frequency offset in a signal modulated by a pseudo-random noise code, the detector comprising:

a receiver for receiving the signal, the receiver having a converter for converting the received signal into a digital signal;

a correlation means for detecting the digital signal, the correlation means including a pseudo-random noise code generator with a frequency matching means, wherein the pseudo-random noise code generator generates a sequence of phase positions in a local PN code for correlation with the digital signal, and wherein a phase position of the sequence corresponds to the pseudo-random noise code used to modulate the received signal; and a digital signal processor for receiving the detected signal correlated with a selected phase position from the sequence of phase positions and extracting a sample therefrom having a pre-determined length, performing a discrete Fourier transform on the sample to generate a plurality of frequency values, each frequency value having an identifying index and a magnitude, the digital signal processor further identifying a highest magnitude value for the plurality of frequency values and comparing the highest magnitude value against a magnitude threshold, wherein the digital signal processor includes a memory for storage of the highest magnitude value and its corresponding identifying index;

wherein, if the highest magnitude exceeds the magnitude threshold, synchronization between the modulating pseudo-random noise code and the selected phase position is attained, and if the highest magnitude is less than the magnitude threshold, a carrier frequency offset is present, and a process is begun wherein the pseudo-random noise generator selects a new phase position from the sequence and the digital signal processor determines the identifying index and the magnitude for each frequency value for the sample corresponding to the new phase position, storing the highest magnitude value and corresponding identifying index in memory, repeating the process until synchronization is attained.

2. A detector as in claim 1, wherein the plurality of frequency values comprises L bins of the discrete Fourier transform and the identifying index is a bin number.

3. A detector as in claim 2, wherein each bin of the L bins is filtered by a bank of filters with one filter corresponding to each bin.

4. A detector as in claim 2, wherein the correlator is a complex correlator and the sample extracted from the detected signal comprises a correlation vector of a plurality of sub-dwells.

5. A detector as in claim 4, wherein the plurality of sub-dwells is fewer than L bins of the discrete Fourier transform and correlation vector is zero-padded to provide a vector length of L.

6. A detector as in claim 5, wherein L is a power of two.

7. A detector as in claim 5, wherein L is eight.

8. A detector as in claim 5, wherein L is sixteen.

9. A detector as in claim 1, wherein the digital signal processor computes the discrete Fourier transform using a fast Fourier transform.

10. A detector as in claim 1, wherein the digital signal processor further averages a plurality of identifying indices obtained from a plurality of samples to determine a frequency offset.

11. A detector as in claim 1, wherein the digital signal processor includes a band of filters, one filter corresponding to each frequency value for determining the highest magnitude value.

12. A method for detecting a carrier frequency offset in a direct sequence spread spectrum signal having a PN modulation, the method comprising:

receiving the PN modulated signal;

extracting a plurality of samples from the received signal at a pre-determined sampling interval;

despreading the received signal by correlation with a selected PN code phase position for a locally generated PN code;

integrating the despread signal over a plurality of sub-dwell intervals;

performing a discrete Fourier transform for each of the plurality of sub-dwell intervals and generating a plurality of frequency bins therefrom, each frequency bin having a bin index and a magnitude;

comparing the magnitude for each frequency bin of the plurality and identifying a highest magnitude and the bin index for the frequency bin having the highest magnitude;

comparing the highest magnitude to a magnitude threshold criteria and declaring synchronization if the highest magnitude meets the threshold criteria, and, if the highest magnitude fails to meet the threshold criteria, declaring a frequency offset and repeating the steps of despreading, integrating, performing a discrete Fourier transform, and comparing for a new selected PN code phase position until synchronization is attained.

13. The method of claim 12, wherein the step of performing a discrete Fourier transform comprises computing a fast Fourier transform.

14. The method of claim 12, further comprising determining whether a quantity of the plurality of sub-dwell intervals is a power of two and, if not, zero-padding a correlation vector containing the sub-dwell interval values to have a vector length which is a power of two.

15. The method of claim 14, wherein the vector length equals a quantity of the plurality of frequency bins.

16. The method of claim 15, wherein the quantity of the plurality of frequency bins is eight.

17. The method of claim 15, wherein the quantity of the plurality of frequency bins is sixteen.

18. The method of claim 12, wherein the step of comparing the magnitude for each frequency bin comprises filtering the magnitudes through a bank of filters.

19. The method of claim 12, further comprising storing the highest magnitude and its corresponding bin index in a memory.

20. The method of claim 12, further comprising estimating the carrier frequency offset after obtaining synchronization comprising the steps of:

repeating for a plurality of iterations the steps of extracting a plurality of samples, despreading the received signal, integrating the despread signal, and performing a discrete Fourier transform a plurality of times using the PN code phase position at which synchronization was obtained;

storing in memory the bin index corresponding to the highest magnitude for each iteration; and calculating an average bin index for the plurality of iterations.

21. In a mobile phone receiver having a PN detector and a digital signal processor, a method for detecting and estimating carrier frequency offset in a received PN code modulated signal, the method comprising:

(a) receiving an analog receive signal;

(b) converting the analog receive signal to a digital signal;

(c) extracting a dwell sample from the digital signal at a pre-determined sampling interval;

(d) in the PN detector, correlating the dwell sample at a s elected PN code phase position, despreading and integrating the dwell sample to generate a correlation vector having a plurality of sub-dwell values;

(e) in the digital signal processor, performing a fast Fourier transform for each of the plurality of sub-dwell values to generate a plurality of frequency values, each frequency value having a magnitude and a bin index;

(f) determining a highest magnitude within the plurality of frequency values and its corresponding bin index;

(g) comparing the highest magnitude with a threshold criteria;

(h) if the highest magnitude meets the threshold criteria, declaring synchronization;

(i) if the highest magnitude fails to meet the threshold criteria, declaring a frequency offset and, in the PN detector, selecting a different selected PN code phase position and repeating steps (d) through (g) until the highest magnitude within the plurality of frequency values meets the threshold criteria;

(j) repeating for a plurality of iterations steps (d) through (g) at the selected PN code phase position at which synchronization was declared; and (k) averaging for the plurality of iterations the bin index corresponding to the highest magnitude for each iteration.

22. The method of claim 21, further comprising determining whether a quantity of the plurality of sub-dwell values is a power of two and, if not, zero-padding the correlation vector to have a vector length which is a power of two.

23. The method of claim 22, wherein the vector length equals a quantity of the plurality of frequency bins.

24. The method of claim 23, wherein the quantity of the plurality of frequency bins is eight.

25. The method of claim 23, wherein the quantity of the plurality of frequency bins is sixteen.

26. The method of claim 21, further comprising storing the highest magnitude and its corresponding bin index in a memory.

* * * * *